United States Patent [19]

Iguchi

[11] 4,224,659
[45] Sep. 23, 1980

[54] STABILIZED POWER SUPPLY CIRCUIT

[75] Inventor: Yasuhide Iguchi, Tsurugashima, Japan

[73] Assignee: Toko, Inc., Tokyo, Japan

[21] Appl. No.: 896,245

[22] Filed: Apr. 14, 1978

[30] Foreign Application Priority Data

Apr. 14, 1977 [JP] Japan ................................ 52/42989

[51] Int. Cl.² ......................................... H02M 3/335
[52] U.S. Cl. .................................................... 363/20
[58] Field of Search ................. 323/17, 22 T, DIG. 1; 363/18, 19, 20, 21, 97; 331/112

[56] References Cited

U.S. PATENT DOCUMENTS

| | | | |
|---|---|---|---|
| 3,035,220 | 5/1962 | Fischer | 363/18 |
| 3,417,306 | 12/1968 | Knak | 363/21 |
| 3,569,779 | 3/1971 | Luursema | 363/18 |
| 3,602,801 | 8/1971 | Williamson | 323/17 |
| 3,889,173 | 6/1975 | Klusmann et al. | 323/17 |
| 3,978,390 | 8/1976 | Remery | 331/112 |
| 4,084,219 | 4/1978 | Furukawa et al. | 363/97 |

Primary Examiner—William M. Shoop
Attorney, Agent, or Firm—Schwartz, Jeffery, Schwaab, Mack, Blumenthal & Koch

[57] ABSTRACT

In a stabilized power supply circuit including a feedback circuit, wherein there alternately occur a time during which a current is caused to flow in a transformer so that energy is stored therein and a time during which the energy stored in the transformer is discharged, there is provided a compensation winding adapted to produce an induced voltage in accordance with an input voltage variation. The induced voltage is employed to correct an output voltage variation which is caused by the operating resistance of the feedback circuit for the time during which energy is stored in the transformer. The feedback circuit may be constituted at least by a Zener diode, control transistor and switching transistor, and the emitter of the control transistor may be grounded through the compensation winding. Thus the stability of the output voltage with respect to input voltage variations can be greatly improved. The compensation winding may be provided at any desired position in the feedback circuit.

11 Claims, 8 Drawing Figures

STABILIZED POWER SUPPLY CIRCUIT

This invention relates to a flyback type stabilized power supply circuit wherein there alternately occur a time during which a current is caused to flow from a DC power source to a transformer winding by turning on a switching transistor so that energy is stored in the transformer winding and a time during which the current is caused to flow out of the transformer winding by turning off the switching transistor so that the energy is discharged, and more particularly it pertains to such a power supply circuit with an improved stability of the output voltage with respect to input voltage variations.

There have heretofore been proposed various types of stabilized power supply circuit, but in such conventional circuits, difficulties have been experienced in that the designing of the circuits is very troublesome and that the resulting circuit arrangements are complicated, whereby the manufacturing cost thereof is inevitably increased.

It is an object of this invention to solve the above-mentioned problems with the prior-art circuit arrangements.

Another object of this invention is to provide a stabilized power supply circuit with an improved output voltage stability with respect to input voltage changes.

According to the invention, there is provided a flyback type stabilized power supply circuit in which there alternately occur a time during which a current flows through a transformer winding so that energy is stored therein and a time during which the energy stored in the transformer is discharged, said power supply circuit including a feedback circuit arranged to provide an induced voltage in accordance with a change in the input voltage, and a compensation winding provided in the feedback circuit for correcting, by the induced voltage, fluctuations in the output voltage which are caused by the operating resistance of the feedback circuit for the time during which energy is stored in the transformer.

Other objects, features and advantages of this invention will become apparent from the following description taken in conjunction with the accompanying drawings.

In order to give better understanding of the present invention, description will first be made of an example of the prior-art flyback type stabilized power supply circuit with reference to FIG. 1 in which a blocking oscillation type stabilized power supply circuit is illustrated by way of example.

Figure 1:
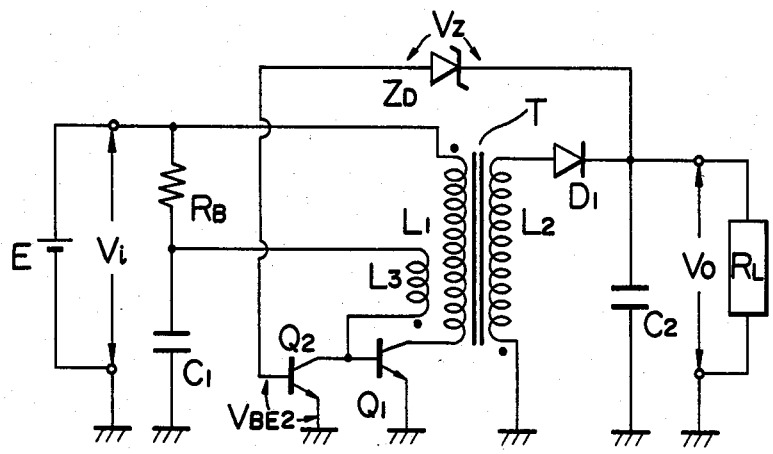
FIG. 1 is a circuit diagram showing an example of the conventional stabilized power supply circuit.

In the conventional voltage stabilizing means such as shown in FIG. 1, it has been the usual practice that an output voltage $V_O$ available at the output terminal of a secondary circuit associated with a transformer T is detected by comparison with a reference voltage $V_S = V_Z + V_{BE2}$ (where $V_Z$ is the Zener voltage of a Zener diode $Z_D$ and $V_{BE2}$ is the base-emitter voltage of a control transistor $Q_2$) which is produced in a feedback circuit constituted by the Zener diode $Z_D$ and control transistor $Q_2$, and that the voltage thus detected is then fed back to the base of a switching transistor $Q_1$ provided in a primary circuit associated with the transformer T, whereby the quantity of energy stored in the transformer is controlled so that the output voltage $V_O$ obtained at the aforementioned output terminal is stabilized.

More specifically, when the output voltage $V_O$ applied across a load $R_L$ exceeds the aforementioned reference voltage $V_S$, the base current $I_{B2}$ of the control transistor $Q_2$ is caused to flow so that this transistor is rendered conductive, as a result of which the base current $I_{B1}$ of the switching transistor $Q_1$ is decreased. If input voltage $V_i$ builds up at this point, this will then tend to increase a voltage $V_{L3}$ induced in a drive winding L3 and thus to increase the base current $I_{B1}$ of the switching transistor $Q_1$. However, the base current $I_{B1}$ is limited by the collector current $I_{C2}$ of the control transistor $Q_2$ which increases with build-up of the input voltage $V_i$. In the prior-art technique, therefore, it has been attempted to shorten the time during which a current is caused to flow in the primary winding of the transformer T, or the time during which energy is stored in the transformer T, thus stabilizing the output voltage $V_O$ available across the load $R_L$.

Figure 2:
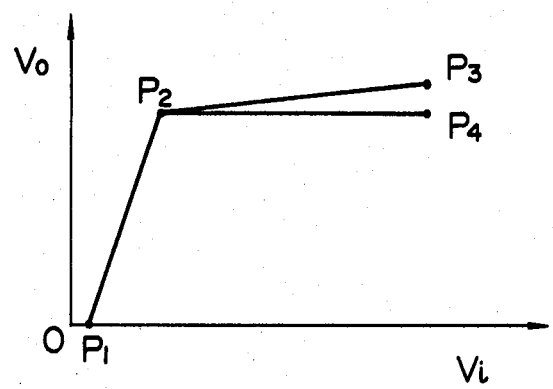
FIG. 2 is a view showing the voltage stabilization characteristics of the circuits shown in FIGS. 1 and 3.

Referring to FIG. 2, there is illustrated the voltage stabilization characteristic of the power supply circuit shown in FIG. 1.

Assume that the input voltage $V_i$ builds up so that the output voltage $V_O$ increases from a point $P_1$ to a point $P_2$ where voltage stabilization is initiated. Then the voltage stabilization is started by means of the feedback circuit which is constituted by the Zener diode $Z_D$ and control transistor $Q_2$ as mentioned above, and when the input voltage $V_i$ increases further, the output voltage $V_O$ applied across the load $R_L$ is stabilized in the range from the point $P_2$ to a point $P_3$ as will be seen from FIG. 2. In the voltage stabilization range from $P_2$ to $P_3$, however, as the input voltage $V_i$ builds up, there is a tendency that changes occur in the reference voltage $V_S$ produced by virtue of the operating resistance of the above-mentioned feedback circuit which is constituted by the operating resistance of the Zener diode $Z_D$ and the equivalent resistance between the base and the emitter of the control transistor $Q_2$ when the latter is conducting (the reference voltage being the sum of the Zener voltage of the Zener diode $Z_D$ and the base-emitter voltage $V_{BE2}$ of the control transistor $Q_2$), so that the output voltage $V_O$ available across the load $R_L$ is increased. Thus, the prior-art arrangement mentioned above is disadvantageous in that the stability of the output voltage with respect to changes in the input voltage $V_i$ is bad. In order to overcome such a disadvantage, the circuit design should be made such that the operating resistance of the feedback circuit can be virtually neglected. Obviously, this makes the designing of the circuit very troublesome and the resulting circuit arrangement very complicated, which inevitably increases the cost of manufacture.

Figure 3:
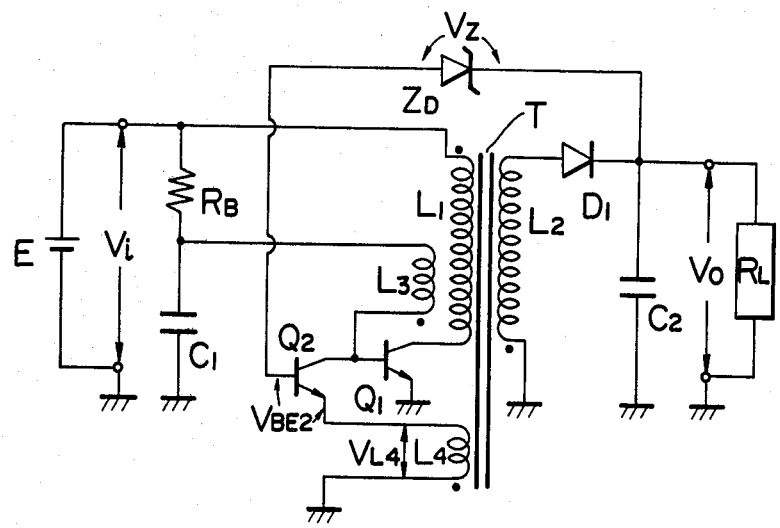
FIG. 3 is a circuit diagram showing the stabilized power supply circuit according to an embodiment of this invention.

Referring to FIG. 3, there is shown an example of the blocking oscillation type stabilized power supply circuit, which will be described hereinbelow.

In the feedback circuit shown in FIG. 3, one of the output terminals is connected with the base of a control transistor $Q_2$ through a Zener diode $Z_D$; the collector of the control transistor $Q_2$ is connected with the base of a switching transistor $Q_1$; and the emitter of the control transistor $Q_2$ is grounded through a compensation winding $L_4$. Parts of FIG. 3 corresponding to those of FIG. 1 are indicated by like references.

The compensation winding $L_4$ is set up in respect of its number of turns so that a voltage is induced therein which serves to cancel out a change which is caused in the reference voltage $V_S$ in the feedback circuit due to an increase in the input voltage $V_i$, that is, an increment of the reference voltage $V_S$ which is caused by the operating resistance of the Zener diode $Z_D$ and the equivalent resistance between the base and the emitter of the control transistor $Q_2$.

Referring now to FIG. 2, there is illustrated the voltage stabilization characteristic of the power supply circuit shown in FIG. 3, and description will be made thereof.

As the input voltage $V_i$ increases, the output voltage builds up from the point $P_1$ to the point $P_2$ (FIG. 2) whereat voltage stabilization starts. When the point $P_2$ is reached, the operation for voltage stabilization is initiated by a feedback circuit comprising the Zener diode $Z_D$, control transistor $Q_2$ and compensation winding $L_4$. As the input voltage $V_i$ increases further, the output voltage $V_O$ across the load $R_L$ remains constant in the range from the point $P_2$ to the point $P_4$. More specifically, in the voltage stabilization range from $P_2$ to $P_4$, as the input voltage $V_i$ increases, the induced voltage $V_{L4}$ produced in accordance with the increase in the input voltage $V_i$ serves to cancel out the change in the reference voltage $V_S$ in the feedback circuit which is caused by the operating resistance of the Zener diode $Z_D$ and the equivalent resistance between the base and the emitter of the control transistor $Q_2$ as the latter is conducting, that is, the sum of an increment of the Zener voltage $V_Z$ of the Zener diode $Z_D$ and that of the base-emitter voltage of the control transistor $Q_2$, whereby the reference voltage $V_S$ is made to be constant and assume a value represented by $V_S = V_Z + V_{BE2} - V_{L4}$. In this way, despite fluctuations of the input voltage $V_i$, the output voltage applied across the load $R_L$ is stabilized while remaining substantially constant; thus, the stability of the output voltage $V_O$ with respect to changes in the input voltage $V_i$ can be enhanced.

Figure 4:
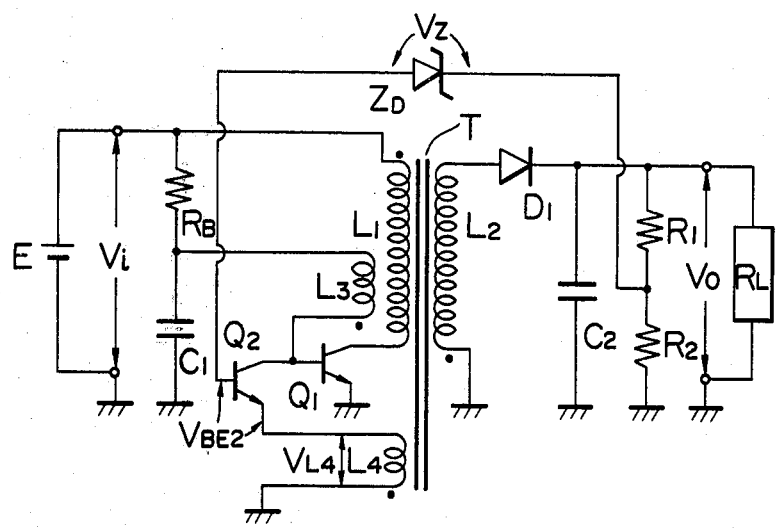
FIG. 4 is a circuit diagram showing a modified form of the circuit shown in FIG. 3.

Referring next to FIG. 4, there is shown a modification to the power supply circuit shown in FIG. 3.

In FIG. 3, the output voltage $V_O$ applied across the load $R_L$ is low, whereas in FIG. 4 such a voltage is high; thus, the circuit arrangement of FIG. 4 constitutes a blocking oscillation type stabilized power supply circuit adapted for providing a high output voltage $V_O$ which exceeds the Zener voltage $V_Z$ of the Zener diode $Z_D$ which is used in the feedback circuit.

The circuit arrangement of FIG. 4 is substantially similar to that of FIG. 3 except that a voltage divider circuit comprising resistors $R_1$ and $R_2$ is connected in parallel with the load $R_L$ so that a high output voltage $V_O$ applied across the load $R_L$ is divided so as to be lower than the feedback voltage applied to the Zener diode $Z_D$ of the feedback circuit. Parts of FIG. 4 corresponding to those of FIGS. 1 and 3 are indicated by like reference.

Furthermore, the feedback circuit shown in FIG. 4 is different from that shown in FIG. 3 in that the voltage dividing resistor $R_1$ is inserted therein. Thus, the operating resistance of the feedback circuit shown in FIG. 4 is equivalently higher than that of the feedback circuit shown in FIG. 3. More specifically, by connecting a resistance component in series with the feedback loop as in the embodiment of FIG. 4, the variation in the output voltage $V_O$ across the load $R_L$ with the variation in the input voltage $V_i$ is generally made to be greater. However, by determining the number of turns of the compensation winding $L_4$ in view of the DC resistance of the voltage dividing resistor $R_1$, it is possible to further improve the stability of the output voltage $V_O$ with respect to changes in the input voltage $V_i$.

Figure 5:
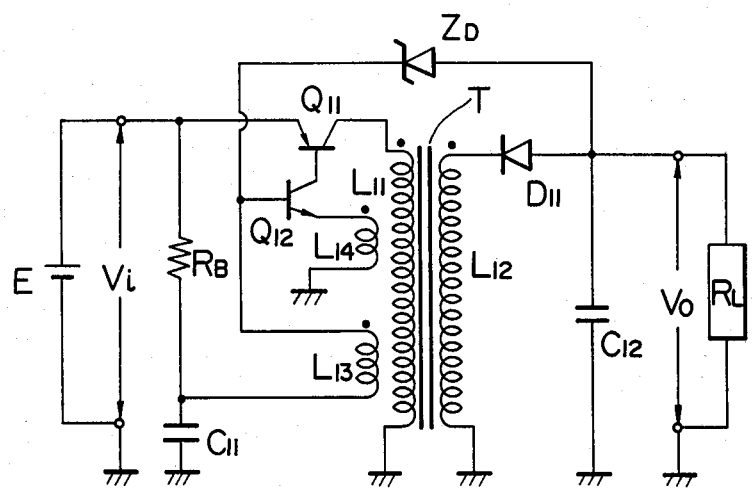
FIG. 5 is a circuit diagram showing the stabilized power supply circuit according to another embodiment of this invention.

In FIGS. 3 and 4, there are shown the blocking oscillation type stabilized power supply circuits in which a positive output voltage is provided, whereas in FIG. 5, there is shown an example of stabilized power supply circuit of the same type wherein a negative output voltage is provided.

In the feedback circuit shown in FIG. 5, one of the output terminals is connected with the base of a control transistor $Q_{12}$ through a Zener diode $Z_D$, and the emitter of the transistor $Q_{12}$ is grounded through a compensation winding $L_{14}$.

Figure 6:
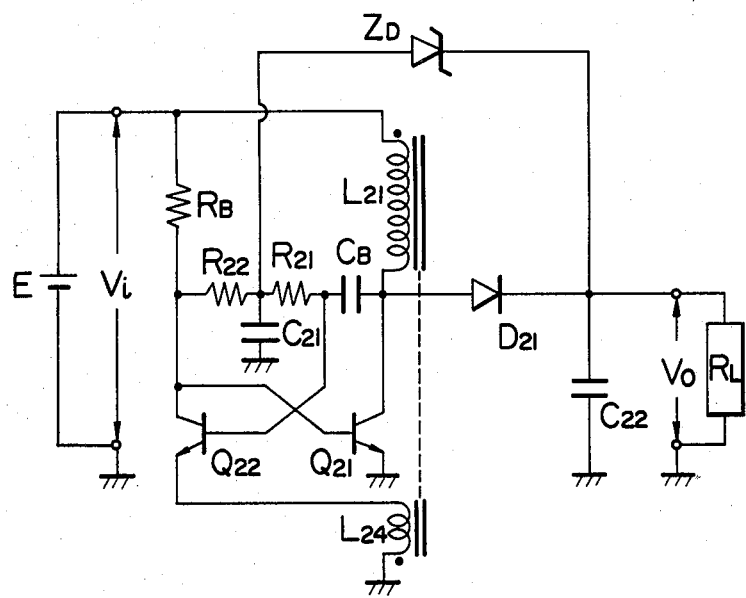
FIG. 6 is a circuit diagram showing the stabilized power supply circuit according to still another embodiment of this invention.

Referring to FIG. 6, there is shown an example of the multi-oscillation type stabilized power supply circuit according to this invention. The expression "multi-oscillation type stabilized power supply circuit" refers to a modified form of blocking oscillator type stabilized power supply circuit wherein no coil is employed for the purpose of effecting phase reversal for oscillation, but such phase reversal is achieved by means of a transistor and positive feedback is effected to produce oscillation.

In the feedback circuit of FIG. 6, which is arranged to feedback a positive output voltage, one of the output terminals is connected with the base of a control transistor $Q_{22}$ through a Zener diode $Z_D$ and bias resistor $R_{21}$; the emitter of the control transistor $Q_{22}$ is grounded through a compensation winding $L_{24}$; and the collector of the control transistor $Q_{22}$ is at least connected with the base of a switching transistor $Q_{21}$.

As will be readily apparent to those skilled in the art, this invention is also applicable to such circuit arrangements as shown in FIGS. 5 and 6, and with the circuit arrangement mentioned just above, it is possible to improve the stability of the output voltage $V_O$ with respect to variations in the input voltage $V_i$.

Figure 7:
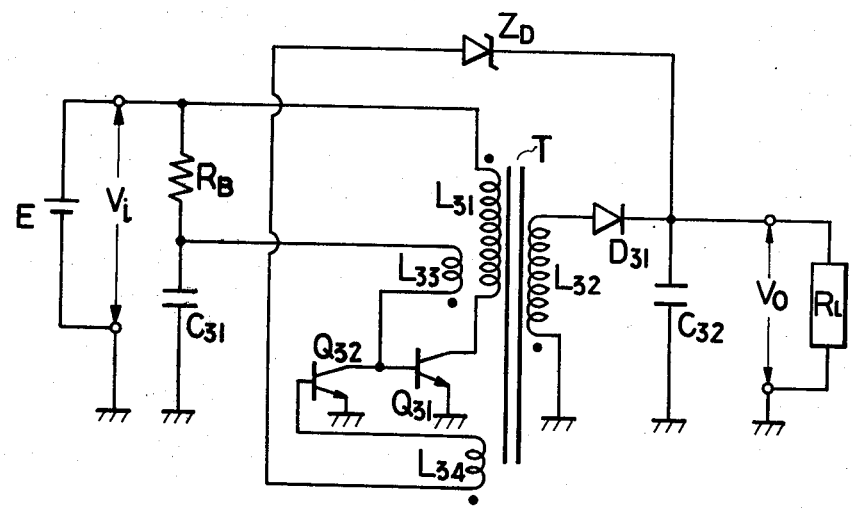
FIG. 7 is a circuit diagram showing the stabilized power supply circuit according to yet another embodiment of the invention.
Figure 8:
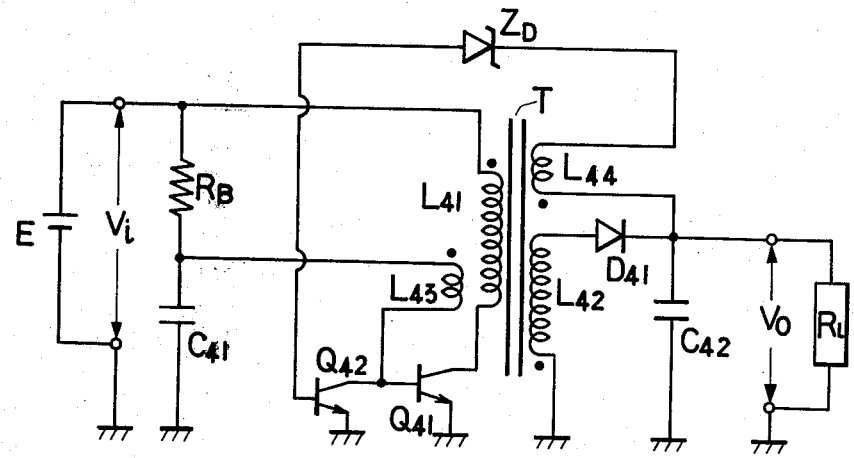
FIG. 8 is a circuit diagram showing the stabilized power supply circuit according to a further embodiment of the invention.

FIGS. 7 and 8 show yet additional embodiments of the invention similar to FIG. 3 but with different interconnections of the compensating winding within the feedback circuit. In particular, FIG. 7 illustrates an embodiment of the invention wherein the compensating winding $L_{34}$ is connected between the control transistor $Q_{32}$ and Zener diode $Z_D$. FIG. 8 illustrates yet another embodiment of the invention wherein the compensating winding $L_{43}$ is connected between the Zener diode $Z_D$ and one of the output terminals.

As will be appreciated from what has been described above, according to this invention, a compensation winding is provided in a feedback circuit, and such a winding is set up so that a voltage induced therein serves to cancel out variations in the output voltage which tend to be caused due to the operating resistances present in the feedback circuit such as the operating resistance of the Zener diode $Z_D$, the equivalent resistance between the base and the emitter of the control transistor when the latter is conducting, the voltage divider resistances and so forth, thereby making it possible to readily improve the stability of the output voltage with respect to the input voltage. In this way, according to the invention, there is provided a stabilized power supply circuit which can be easily designed in respect of the circuit constants thereof, simplified in construction and manufactured at low cost.

Though, in the foregoing, description has been made of the cases where this invention is applied to power supply circuits each arranged to stabilize the output voltage by providing a feedback from the secondary circuit to the primary circuit, it is to be understood that this invention is also applicable to other types of stabilized power supply circuits such as input-output insulated type DC-DC converts, AC-DC converters of the same type and so forth wherein a flyback output is rectified in the primary circuit, a DC voltage is produced which is proportional to the secondary rectified output, and the DC voltage is compared with a reference voltage $V_S$, thus stabilizing the output voltage.

What is claimed is:

1. A stabilized power supply circuit including a feedback circuit and output terminals, wherein there alternately occurs a time during which a current is caused to flow in a transformer so that energy is stored therein and a time during which the energy stored in the transformer is discharged, the improvement comprising a compensation winding which is connected in series with said feedback circuit so that a voltage proportional to an input voltage is produced whereby an output voltage variation across said output terminals caused by the operating resistance of said feedback circuit is cancelled.

2. A stabilized power supply circuit according to claim 1, wherein said feedback circuit comprises a Zener diode, control transistor and switching transistor, and wherein one of the output terminals is connected with the base of said control transistor through said Zener diode, the collector of said control transistor is connected with the base of said switching transistor, and the emitter of said control transistor is grounded through said compensation winding.

3. A stabilized power supply circuit according to claim 1, wherein said feedback circuit comprises a Zener diode, control transistor, switching transistor, and voltage divider which is connected across the output terminals.

4. A stabilized power supply circuit according to claim 1, wherein said feedback circuit comprises a Zener diode, control transistor and switching transistor and is arranged to feed back a negative output voltage, and wherein one of the output terminals is connected with the base of said control transistor through said Zener diode, the collector of said control transistor is connected with the base of said switching transistor, and the emitter of said control transistor is grounded through said compensation winding.

5. A stabilized power supply circuit according to claim 1, wherein said feedback circuit comprises a Zener diode, control transistor and switching transistor and is arranged to feed back a positive output voltage, and wherein one of the output terminals is connected with the base of said control transistor through said Zener diode and a bias resistor, the collector of said control transistor is at least connected with the base of said switching transistor having the emitter thereof grounded, and the emitter of said control transistor is grounded through said compensation winding.

6. A stabilized power supply circuit according to claim 1, wherein said feedback circuit comprises a Zener diode, control transistor and switching transistor, and wherein said compensation winding is connected between the base of said control transistor and said Zener diode.

7. A stabilized power supply circuit according to claim 1, wherein said feedback circuit comprises a Zener diode, control transistor and switching transistor, and wherein said compensation winding is connected between said Zener diode and one of the output terminal.

8. A stabilized power supply circuit according to claim 6, wherein said feedback circuit is arranged to feed back a negative output voltage.

9. A stabilized power supply circuit according to claim 7, wherein said feedback circuit is arranged to feed back a negative output voltage.

10. A stabilized power supply circuit according to claim 6, wherein said feedback circuit is arranged to feed back a positive output voltage.

11. A stabilized power supply circuit according to claim 7, wherein said feedback circuit is arranged to feed back a positive output voltage.

* * * * *